United States Patent [19]

(12) United States Patent (10) Patent No.: US 8,258,332 B2
Hogan et al. (45) Date of Patent: Sep. 4, 2012

(54) POLYMERS FUNCTIONALIZED WITH HALOSILANES CONTAINING AN AMINO GROUP

(75) Inventors: Terrence E. Hogan, Akron, OH (US); Steven Luo, Copley, OH (US); Yoichi Ozawa, Tokyo (JP); Junko Matsushita, Tokyo (JP); Ryuji Nakagawa, Tokyo (JP); Eiju Suzuki, Tokyo (JP); Ken Tanaka, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 41 days.

(21) Appl. No.: 12/665,539

(22) PCT Filed: Jun. 18, 2008

(86) PCT No.: PCT/US2008/007601
§ 371 (c)(1),
(2), (4) Date: Sep. 2, 2010

(87) PCT Pub. No.: WO2008/156788
PCT Pub. Date: Dec. 24, 2008

(65) Prior Publication Data
US 2010/0317818 A1    Dec. 16, 2010

Related U.S. Application Data

(60) Provisional application No. 60/936,070, filed on Jun. 18, 2007, provisional application No. 61/034,505, filed on Mar. 7, 2008.

(51) Int. Cl.
*C08F 4/44* (2006.01)
*C08F 8/32* (2006.01)
*C07F 7/02* (2006.01)
*C09K 3/00* (2006.01)

(52) U.S. Cl. ... 556/407; 526/164; 526/335; 252/182.15; 528/37; 528/38; 528/19

(58) Field of Classification Search ............... 528/19, 528/37, 38; 556/407; 252/182.15; 526/164, 526/335
See application file for complete search history.

(56) References Cited

U.S. PATENT DOCUMENTS

| | | | |
|---|---|---|---|
| 4,429,089 A * | 1/1984 | Pedretti et al. | 526/153 |
| 4,578,492 A * | 3/1986 | Pratt et al. | 556/407 |
| 4,804,771 A * | 2/1989 | Pepe | 556/407 |
| 5,082,958 A * | 1/1992 | Wright et al. | 556/413 |
| 5,777,144 A * | 7/1998 | Rubinsztajn et al. | 556/407 |
| 5,962,559 A * | 10/1999 | Lucas et al. | 524/104 |
| 7,202,375 B2 | 4/2007 | Tonomura et al. | |

(Continued)

FOREIGN PATENT DOCUMENTS
EP    1 481 980 A1    12/2004
(Continued)

OTHER PUBLICATIONS

Auner et al. "Synthese und Thermolyseverhalten von Si-funktionelle 2-Silaazetidinen", Chem. Ber. 1993, 126, 581-589.*

(Continued)

*Primary Examiner* — Robert Loewe
(74) *Attorney, Agent, or Firm* — Meredith E. Hooker; Arthur M. Reginelli

(57) ABSTRACT

A method for preparing a functionalized polymer, the method comprising the steps of preparing a reactive polymer, and reacting the reactive polymer with a halosilane compound containing an amino group.

25 Claims, 1 Drawing Sheet

U.S. PATENT DOCUMENTS

| | | | |
|---|---|---|---|
| 7,427,651 B2 | 9/2008 | Shibata et al. | |
| 7,491,786 B2 * | 2/2009 | Scheim et al. | 528/38 |
| 2004/0242911 A1 * | 12/2004 | Tonomura et al. | 556/410 |
| 2004/0254301 A1 * | 12/2004 | Tsukimawashi et al. | 525/271 |
| 2005/0038215 A1 * | 2/2005 | Luo et al. | 526/335 |
| 2005/0197474 A1 | 9/2005 | Tartamella et al. | |
| 2005/0234254 A1 * | 10/2005 | Tonomura et al. | 556/412 |
| 2006/0173138 A1 * | 8/2006 | Hogan et al. | 525/370 |

FOREIGN PATENT DOCUMENTS

| | | |
|---|---|---|
| EP | 1 721 930 A1 | 11/2006 |
| EP | 2169002 A1 | 3/2010 |
| JP | 2004-352695 A | 12/2004 |
| JP | 2006 045400 A | 2/2006 |
| JP | 2006 169381 A | 6/2006 |
| JP | 2006 257261 A | 9/2006 |
| WO | WO 2006/013732 A1 | 2/2006 |
| WO | WO 2006/112450 A1 | 10/2006 |

OTHER PUBLICATIONS

Peters et al., "Termination of Living Anionic Polymerizations Using Chlorosilane Derivatives: A General Synthetic Methodology for the Synthesis of End-Functionalized Polymers," J. Am. Chem. Soc., vol. 117, No. 12, (1995), pp. 3380-3388.

International Report on Patentability, International Application No. PCT/US2008/007601, dated Jan. 7, 2010, 11 pages.

International Search Report, International Application No. PCT/US2008/007601, dated Oct. 1, 2010, 5 pages.

\* cited by examiner

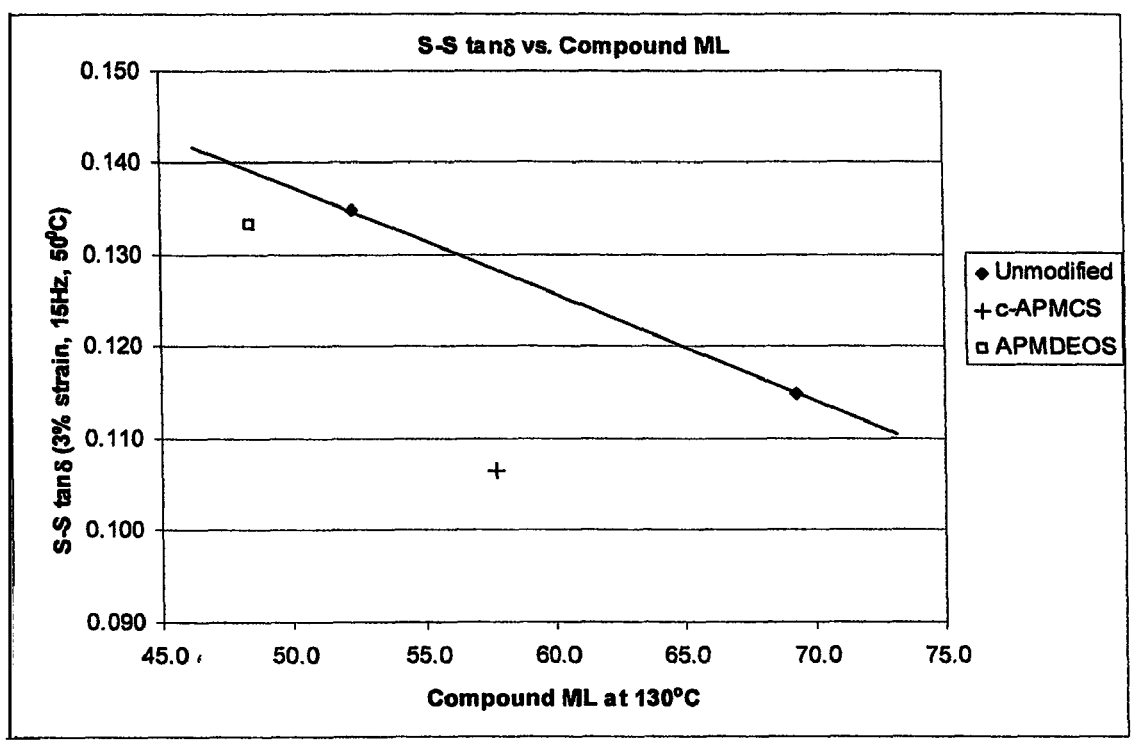

POLYMERS FUNCTIONALIZED WITH HALOSILANES CONTAINING AN AMINO GROUP

This invention claims the priority of International Application Serial No. PCT/US2008/007601, filed on Jun. 18, 2008, U.S. Provisional Patent Application Ser. No. 60/936,070, filed on Jun. 18, 2007, and U.S. Provisional Patent Application Ser. No. 61/034,505, filed on Mar. 7, 2008 which are incorporated herein by reference.

FIELD OF THE INVENTION

One or more embodiments of the present invention relates to functionalized polymers and methods for their manufacture.

BACKGROUND OF THE INVENTION

In the art of manufacturing tires, it is desirable to employ rubber vulcanizates that demonstrate reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates. Functionalized polymers have been employed to reduce hysteresis of rubber vulcanizates. The functional group of the functionalized polymer may reduce the number of free polymer chain ends via interaction with filler particles. Also, the functional group may reduce filler agglomeration. Nevertheless, whether a particular functional group imparted to a polymer can reduce hysteresis is often unpredictable.

End-functionalized polymers may be prepared by post-polymerization treatment of reactive polymers with certain functionalizing agents. However, whether a reactive polymer can be functionalized by treatment with a particular functionalizing agent can be unpredictable. For example, functionalizing agents that work for one type of polymerization system do not necessarily work for another type of polymerization system and vice versa.

Lanthanide-based catalyst systems are known to be useful for polymerizing conjugated diene monomers to form polydienes having a high content of cis-1,4 linkages. The resulting cis-1,4-polydienes may display pseudo-living characteristics in that, upon completion of the polymerization, some of the polymer chains possess reactive ends that can react with certain functionalizing agents to yield functionalized cis-1,4-polydienes.

The cis-1,4-polydienes produced with lanthanide-based catalyst systems typically have a linear backbone, which is believed to provide better tensile properties, higher abrasion resistance, lower hysteresis, and better fatigue resistance as compared to the cis-1,4-polydienes prepared with other catalyst systems such as titanium-, cobalt-, and nickel-based catalyst systems. Therefore, the cis-1,4-polydienes made with lanthanide-based catalysts are particularly suitable for use in tire components such as sidewalls and treads.

Anionic initiators are known to be useful for the polymerization of conjugated diene monomers to form polydienes having a combination of 1,2-, cis-1,4- and trans-1,4-linkages. Anionic initiators are also useful for the copolymerization of conjugated diene monomers with vinyl-substituted aromatic compounds. The polymers prepared with anionic initiators may display living characteristics in that, upon completion of the polymerization, the polymer chains possess living ends that are capable of reacting with additional monomers for further chain growth or reacting with certain functionalizing agents to give functionalized polymers.

Because functionalized polymers are advantageous, especially in the manufacture of tires, there exists a need to develop new functionalized polymers that give reduced hysteresis.

SUMMARY OF THE INVENTION

One or more embodiments of the present invention provide a method for preparing a functionalized polymer, the method comprising the steps of preparing a reactive polymer and reacting the reactive polymer with a halosilane compound containing an amino group.

One or more embodiments of the present invention provide a method for preparing a functional polymer, the method comprising the steps of introducing conjugated diene monomer, optionally monomer copolymerizable therewith, and a catalyst or initiator to form a polymerization mixture; and adding a halosilane compound containing an amino group to the polymerization mixture.

One or more embodiments of the present invention provide a method for preparing a polymer, the method comprising preparing a polymerization mixture and adding a halosilane compound containing an amino group to the polymerization mixture.

One or more embodiments of the present invention provide a functionalized polymer prepared by the steps of polymerizing monomer to form a reactive polymer and reacting the reactive polymer with a halosilane compound containing an amino group.

One or more embodiments of the present invention provide a functionalized polymer defined by the formula:

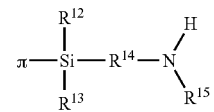

where $R^{12}$ includes a monovalent organic group, $R^{13}$ includes a monovalent organic group, a hydroxy group, or a halogen atom, where $R^{14}$ includes a covalent bond or a divalent organic group, and $R^{15}$ includes a hydrogen atom or a monovalent organic group, and where $\pi$ is a polymer chain.

One or more embodiments of the present invention provide a functionalized polymer defined by the formula:

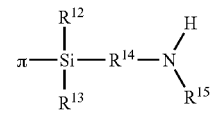

where $R^{12}$ includes a monovalent organic group or a hydrocarbyloxy group, $R^{13}$ includes a monovalent organic group, a hydroxy group, a halogen atom, or a hydrocarbyloxy group, where $R^{14}$ includes a covalent bond or a divalent organic group, and $R^{15}$ includes a hydrogen atom or a monovalent organic group, and where $\pi$ is a cis-1,4-polydiene having a cis-1,4-linkage content that is greater than about 60%.

One or more embodiments of the present invention provide a compound defined by the formula

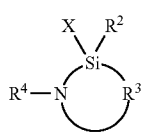

where X is a halogen atom, $R^2$ is a halogen atom, a hydrocarbyloxy group, or a monovalent organic group, $R^3$ is a divalent organic group, and $R^4$ is a monovalent organic group or a hydrolyzable group.

BRIEF DESCRIPTION OF THE DRAWINGS

FIG. 1 is a graphical plot of hysteresis loss (tan δ) versus Mooney viscosity (ML 1+4 at 130° C.) for vulcanizates prepared from functionalized cis-1,4-polybutadiene prepared according to one or more embodiments of the present invention as compared to vulcanizates prepared from unfunctionalized cis-1,4-polybutadiene.

DETAILED DESCRIPTION OF ILLUSTRATIVE EMBODIMENTS

According to one or more embodiments of the present invention, a reactive polymer is prepared by polymerizing conjugated diene monomer and optionally monomer copolymerizable therewith, and this reactive polymer can then be functionalized by reaction with a halosilane compound containing a silylated amino group. The resultant functionalized polymers can be used in the manufacture of tire components. In one or more embodiments, the resultant functionalized polymers, which include cis-1,4-polydienes and poly(styrene-co-butadiene), exhibit advantageous cold-flow resistance and provide tire components that exhibit advantageously low hysteresis.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Examples of monomer copolymerizable with conjugated diene monomer include vinyl-substituted aromatic compounds such as styrene, p-methylstyrene, α-methylstyrene, and vinylnaphthalene.

In one or more embodiments, the reactive polymer is prepared by coordination polymerization, wherein monomer is polymerized by using a coordination catalyst system. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). Coordination catalysts are believed to initiate the polymerization of monomer by a mechanism involving the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain.

The coordination polymerization of conjugated dienes is believed to proceed via n-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components (e.g., a Lewis acid or a Lewis base).

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Useful coordination catalyst systems include lanthanide-based catalyst systems. These catalyst systems may advantageously produce cis-1,4-polydienes that, prior to quenching, have reactive chain ends and may be referred to as pseudo-living polymers. While other coordination catalyst systems may also be employed, lanthanide-based catalysts have been found to be particularly advantageous, and therefore, without limiting the scope of the present invention, will be discussed in greater detail.

The practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e., a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl) phosphate, neodymium (1-methylheptyl)(2-ethylhexyl) phosphate, and neodymium (2-ethylhexyl)(p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl)(1-methylheptyl)phosphonate, neodymium (2-ethylhexyl)(2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl)(p-nonylphenyl)phosphonate, neodymium butyl (2-ethylhexyl) phosphonate, neodymium (2-ethylhexyl)butylphosphonate, neodymium (1-methylheptyl)(2-ethylhexyl)phosphonate, neodymium (2-ethylhexyl)(1-methylheptyl)phosphonate, neodymium (2-ethylhexyl)(p-nonylphenyl)phosphonate, and neodymium (p-nonylphenyl)(2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl)(2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound.

The term "organolanthanide compound" may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a monovalent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and, ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichlorides include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

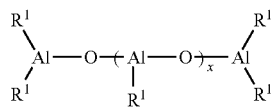

and oligomeric cyclic aluminoxanes that can be represented by the general formula:

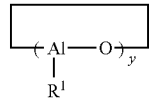

where x may be an integer of 1 to about 100, and in other embodiments about 10 to about 50; y may be an integer of 2 to about 100, and in other embodiments about 3 to about 20; and where each $R^1$, which may be the same or different, may be a monovalent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclop entylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutyl aluminum hydride are employed in combination.

The term "organomagnesium compound" may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a monovalent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, tin, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a monovalent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The lanthanide-based catalyst composition can be formed by various methods.

In one embodiment, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide compound, and then followed by the halogen-containing compound, if used, or by the compound containing a non-coordinating anion or the non-coordinating anion precursor.

In another embodiment, the lanthanide-based catalyst composition may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting catalyst composition may be aged, if desired, prior to being added to the monomer that is to be polymerized.

In yet another embodiment, the lanthanide-based catalyst composition may be formed by using a two-stage procedure. The first stage may involve combining the alkylating agent with the lanthanide compound either in the absence of any monomer or in the presence of a small amount of at least one conjugated diene monomer at an appropriate temperature, which may be from about −20° C. to about 80° C. The amount of monomer employed in the first stage may be similar to that set forth above for performing the catalyst. In the second stage, the mixture formed in the first stage and the halogen-containing compound, non-coordinating anion, or non-coordinating anion precursor can be charged in either a stepwise or simultaneous manner to the monomer that is to be polymerized.

In one or more embodiments, a solvent may be employed as a carrier to either dissolve or suspend the lanthanide-based catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

In one or more embodiments, the reactive polymer is prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101 (12), 3747-3792). Anionic initiators may advantageously produce living polymers that, prior to quenching, are capable of reacting with additional monomers for further chain growth or reacting with certain functionalizing agents to give functionalized polymers.

The practice of this invention is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black filled vulcanizates prepared from polymers containing the functional group as compared to similar carbon-black filled vulcanizates prepared from polymer that does not include the functional group.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference.

In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

Anionic polymerization may be conducted in polar solvents, non-polar solvents, and mixtures thereof. Exemplary solvents have been set forth above. When preparing elastomeric copolymers, such as those containing conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

Compounds useful as randomizers include those having an oxygen or nitrogen heteroatom and a non-bonded pair of electrons. Examples include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N-N-dimethylpiperazine, diazabicyclooctane, dimethyl ether, diethyl ether, tri-n-butylamine, and mixtures thereof. In other embodiments, potassium alkoxides can be used to randomize the styrene distribution.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Regardless of whether the reactive polymer is prepared by coordination polymerization or anionic polymerization techniques, the production of the reactive polymer can be accomplished by polymerizing conjugated diene monomer, optionally together with monomer copolymerizable with conjugated diene monomer, in the presence of a catalytically effective amount of the catalyst or initiator. The introduction of the catalyst or initiator, the conjugated diene monomer, optionally the comonomer, and any solvent if employed forms a polymerization mixture in which the reactive polymer is formed. The amount of the catalyst or initiator to be employed may depend on the interplay of various factors such as the type of catalyst or initiator employed, the purity of the ingredients, the polymerization temperature, the polymerization rate and conversion desired, the molecular weight desired, and many other factors. Accordingly, a specific catalyst or initiator amount cannot be definitively set forth except to say that catalytically effective amounts of the catalyst or initiator may be used.

In one or more embodiments, where a coordination catalyst (e.g., a lanthanide-based catalyst) is employed, the amount of the coordinating metal compound (e.g., a lanthanide compound) used can be varied from about 0.001 to about 2 mmol, in other embodiments from about 0.005 to about 1 mmol, and in still other embodiments from about 0.01 to about 0.2 mmol per 100 gram of monomer.

In other embodiments, where an anionic initiator (e.g., an alkyllithium compound) is employed, the initiator loading may be varied from about 0.05 to about 100 mmol, in other embodiments from about 0.1 to about 50 mmol, and in still other embodiments from about 0.2 to about 5 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Regardless of whether the polymerization is catalyzed or initiated by a coordination catalyst system (e.g., a lanthanide-based system) or an anionic initiator (e.g., an alkyllithium initiator), some or all of the resulting polymer chains may possess reactive ends, which are either pseudo-living or living, before the polymerization mixture is quenched. As noted above, the reactive polymer may be referred to as a pseudo-living polymer where a coordination catalyst is employed or as a living polymer where an anionic initiator is employed. The percentage of polymer chains possessing a reactive end depends on various factors such as the type of catalyst or initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer can be reacted with halosilane compound containing an amino group or mixtures thereof to form the functionalized polymer of this invention.

In one or more embodiments, halosilane compounds containing an amino group, which may be referred to herein simply as halosilane compounds, may include cyclic and acyclic compounds. In one or more embodiments, the amino group is a protected or secondary amino group. In one or more embodiments, the halosilane compound includes a silylated amino group. In other embodiments, the halosilane compound includes a hydrocarbylated amino group.

In one or more embodiments, halosilanes useful in practicing the present invention may be defined by the formula:

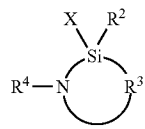

where X is a halogen atom, $R^2$ is a halogen atom, a hydrocarbyloxy group, or a monovalent organic group, $R^3$ is a divalent organic group, and $R^4$ is a monovalent organic group or a hydrolyzable group. In one or more embodiments, hydrocarbyloxy groups include those groups defined by the formula —OR, where R is a monovalent organic group (e.g. alkoxy or aryloxy groups).

In one or more embodiments, monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. The divalent organic groups may also contain one or more heteroatoms such as, but not limited to, nitrogen, oxygen, boron, silicon, sulfur, and phosphorus atoms.

In one or more embodiments, $R^2$ may be an alkyl group including from about 1 to about 10 carbon atoms, and in other embodiments include less than 7 carbon atoms. In certain embodiments, $R^2$ may be an alkoxy group including from about 1 to about 10 carbon atoms, and in other embodiments include alkoxy groups including less than 7 carbon atoms.

In one or more embodiments, $R^3$ is an alkylene group including from 2 to about 10 carbon atoms, and in other embodiments, from about 3 to about 5 carbon atoms.

In one or more embodiments, $R^4$ is an alkyl group including from 1 to about 20 carbon atoms, in other embodiments, less than 12 carbon atoms, and in other embodiments less than 8 carbon atoms.

In one or more embodiments, $R^4$ includes a hydrolyzable protecting group. Hydrolyzable protecting groups include those groups or substituents that are relatively stable, and therefore remain chemically bonded to the nitrogen atom, in non-aqueous environments or those that are devoid or substantially devoid of water. Once exposed to water, however, the hydrolyzable groups or substituents hydrolyze and are thereby cleaved from the nitrogen atom. As a result, the hydrolyzable groups are replaced by a hydrogen atom. An example of a hydrolyzable group is a silyl group, such as a trihydrocarbylsilyl group. Specific examples include trimethylsilyl group (i.e., —$Si(CH_3)_3$), t-butyldimethylsilyl group, triethylsilyl group, tripropylsilyl group, and triphenylsilyl group. A catalyst may also be used to remove the silyl group. Suitable catalysts include tetrabutyl ammonium fluoride and strong acids such as hydrochloric acid.

In one or more embodiments, other halosilanes useful in practicing the present invention may be defined by the formula:

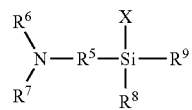

where X is a halogen atom, $R^5$ is a divalent organic group, $R^6$ and $R^7$ are each independently a monovalent organic group or a hydrolyzable group, or $R^6$ and $R^7$ join to form a divalent organic group, and $R^8$ and $R^9$ are each independently a halogen atom, a hydrocarbyloxy group, or a monovalent organic group. The monovalent, divalent, and hydrolyzable groups can be the same as those defined above. In particular embodiments, at least one of $R^6$ and $R^7$ is a hydrolyzable group. In other embodiments, both $R^6$ and $R^7$ are hydrolyzable groups. In one or more embodiments, at least one of $R^8$ and $R^9$ is a monovalent organic group. In one or more embodiments, $R^8$ and $R^9$ are hydrocarbyl groups.

In particular embodiments, $R^6$ and $R^7$ join to form a hydrolyzable divalent organic group. In particular embodiments, the hydrolyzable divalent organic group is a α, ω dialkyl silyl alkylene group, which thereby forms a halosilane defined by the formula

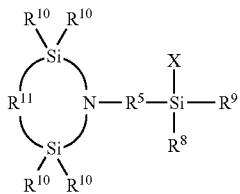

where each $R^{10}$ is individually a monovalent organic group, $R^{11}$ is a divalent organic group, $R^5$ is a divalent organic group, $R^8$ and $R^9$ are each independently a halogen atom, a hydrocarbyloxy group, or a monovalent organic group, and X is a halogen atom. These groups can be the same as defined above. In other embodiments, both $R^6$ and $R^7$ are hydrolyzable groups. In one or more embodiments, at least one of $R^8$ and $R^9$ is a monovalent organic group. In one or more embodiments, $R^8$ and $R^9$ are hydrocarbyl groups.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a monovalent organic group such as a hydrocarbyl group.

In one or more embodiments, useful halosilanes include 1-trihydrocarbylsilyl-2-halo-2-hydrocarbyl-1-aza-2-silacyclohydrocarbons, which may include, but are not limited to, 1-tri($C_1$-$C_{12}$)hydrocarbylsilyl-2-halo-2-($C_1$-$C_{12}$) hydrocarbyl-1-aza-2-sila($C_1$-$C_{12}$)cyclohydrocarbons.

Specific types of useful halosilanes include, but are not limited to, 1-trialkylsilyl-2-halo-2-alkyl-1-aza-2-silacycloalkane, 1-trialkylsilyl-2-halo-2-aryl-1-aza-2-silacycloalkane, 1-trialkylsilyl-2-halo-2-cycloalkyl-1-aza-2-silacycloalkane, 1-triarylsilyl-2-halo-2-alkyl-1-aza-2-silacycloalkane, 1-triarylsilyl-2-halo-2-aryl-1-aza-2-silacycloalkane, 1-triarylsilyl-2-halo-2-cycloalkyl-1-aza-2-silacycloalkane, 1-tricycloalkylsilyl-2-halo-2-alkyl-1-aza-2-silacycloalkane, 1-tricycloalkylsilyl-2-halo-2-aryl-1-aza-2-silacycloalkane, and 1-tricycloalkylsilyl-2-halo-2-cycloalkyl-1-aza-2-silacycloalkane.

Specific examples of useful halosilanes include, but are not limited to, 1-trimethylsilyl-2-chloro-2-methyl-1-aza-2-silacyclopentane, 1-triethylsilyl-2-chloro-2-methyl-1-aza-2-silacyclopentane, 1-trimethylsilyl-2-chloro-2-phenyl-1-aza-2-silacyclopentane, 1-triisopropylsilyl-2-chloro-2-phenyl-1-aza-2-silacyclopentane, 1-tri-t-butylsilyl-2-chloro-2-phenyl-1-aza-2-silacyclopentane, 1-tri-n-butylsilyl-2-chloro-2-phenyl-1-aza-2-silacyclopentane, 1-triethylsilyl-2-chloro-2-methyl-1-aza-2-silacyclohexane, 1-triethylsilyl-2-chloro-2-methyl-1-aza-2-silacycloheptane, 1-triethylsilyl-2-chloro-2-cyclopentyl-1-aza-2-silacyclopentane, 1-triethylsilyl-2-chloro-2-cyclohexyl-1-aza-2-silacyclohexane, 1-triphenylsilyl-2-chloro-2-methyl-1-aza-2-silacyclopentane, 1-triphenylsilyl-2-chloro-2-phenyl-1-aza-2-silacyclopentane, 1-triphenylsilyl-2-chloro-2-ethyl-1-aza-2-silacyclohexane, 1-cyclopentylsilyl-2-chloro-2-ethyl-1-aza-2-silacyclohexane, and 1-cyclopentylsilyl-2-chloro-2-cyclohexyl-1-aza-2-silacyclohexane.

Other specific types of useful halosilanes include, but are not limited to, [N,N-bis(trialkylsilyl)-3-amino-1-propyl](alkyl)(dihalo)silane, [N,N-bis(trialkylsilyl)-3-amino-1-propyl](trihalo)silane, [N,N-bis(trialkylsilyl)-3-amino-1-propyl](dialkyl)(halo)silane, (3-dialkylamino-1-propyl)(alkyl)(dihalo)silane, (3-dialkylamino-1-propyl)(trihalo)silane, (3-dialkylamino-1-propyl)(dialkyl)(halo)silane, (3-diarylamino-1-propyl)(alkyl)(dihalo)silane, (3-diarylamino-1-propyl)(trihalo)silane, (3-diarylamino-1-propyl)(dialkyl)(halo)silane, [N,N-bis(trialkylsilyl)-4-amino-1-butyl](alkyl)(dihalo)silane, [N,N-bis(trialkylsilyl)-4-amino-1-butyl](trihalo)silane, [N,N-bis(trialkylsilyl)-4-amino-1-butyl](dialkyl)(halo)silane, (4-dialkylamino-1-butyl)(alkyl)(dihalo)silane, (4-dialkylamino-1-butyl)(trihalo)silane, (4-dialkylamino-1-butyl)(dialkyl)(halo)silane, (4-diarylamino-1-butyl)(alkyl)(dihalo)silane, (4-diarylamino-1-butyl)(trihalo)silane, and (4-diarylamino-1-butyl)(dialkyl)(halo)silane.

Other specific examples of useful halosilanes include, but are not limited to, [N,N-bis(triethylsilyl)-3-amino-1-propyl](ethyl)(dichloro)silane, [N,N-bis(trimethylsilyl)-3-amino-1-propyl](trichloro)silane, [N,N-bis(trimethylsilyl)-3-amino-1-propyl](dimethyl)(chloro)silane, (3-dimethylamino-1-propyl)(methyl)(dichloro)silane, (3-dimethylamino-1-propyl)(trichloro)silane, (3-dimethylamino-1-propyl)(dimethyl)(chloro)silane, (3-diphenylamino-1-propyl)(methyl)(dichloro)silane, (3-diphenylamino-1-propyl)(trichloro)silane, (3-diphenylamino-1-propyl)(dimethyl)(chloro)silane, [N,N-bis(trimethylsilyl)-4-amino-1-butyl](methyl)(dichloro)silane, [N,N-bis(trimethylsilyl)-4-amino-1-butyl](trichloro)silane, [N,N-bis(trimethylsilyl)-4-amino-1-butyl](dimethyl)(chloro)silane, (4-dimethylamino-1-butyl)(methyl)(dichloro)silane, (4-dimethylamino-1-butyl)(trichloro)silane, (4-dimethylamino-1-butyl)(dimethyl)(chloro)silane, (4-diphenylamino-1-butyl)(methyl)(dichloro)silane, (4-diphenylamino-1-butyl)(trichloro)silane, and (4-diphenylamino-1-butyl)(dimethyl)(chloro)silane.

Still other specific types of useful halosilanes include [3-(2,2,5,5-tetraalkyl-1-aza-2,5-disila-1-cyclopentyl)-1-propyl](alkyl)(dihalo)silane, [3-(2,2,5,5-tetraaryl-1-aza-2,5-disila-1-cyclopentyl)-1-propyl](alkyl)(dihalo)silane, [3-(2,2,5,5-tetraalkyl-1-aza-2,5-disila-1-cyclopentyl)-1-propyl](trihalo)silane, [3-(2,2,5,5-tetraaryl-1-aza-2,5-disila-1-cyclopentyl)-1-propyl](trihalo)silane, [3-(2,2,5,5-tetraalkyl-1-aza-2,5-disila-1-cyclopentyl)-1-propyl](dialkyl)(halo)silane, [3-(2,2,5,5-tetraaryl-1-aza-2,5-disila-1-cyclopentyl)-1-propyl](dialkyl)(halo)silane, [4-(2,2,5,5-tetraalkyl-1-aza-2,5-disila-1-cyclopentyl)-1-butyl](alkyl)(dihalo)silane, [4-(2,2,5,5-tetraaryl-1-aza-2,5-disila-1-cyclopentyl)-1-butyl](alkyl)(dihalo)silane, [4-(2,2,5,5-tetraalkyl-1-aza-2,5-disila-1-cyclopentyl)-1-butyl](trihalo)silane, [4-(2,2,5,5-tetraaryl-1-aza-2,5-disila-1-cyclopentyl)-1-butyl](trihalo)silane, [4-(2,2,5,5-tetraalkyl-1-aza-2,5-disila-1-cyclopentyl)-1-butyl]

(dialkyl)(halo)silane, and [4-(2,2,5,5-tetraaryl-1-aza-2,5-disila-1-cyclopentyl)-1-butyl](dialkyl)(halo)silane.

Still other specific examples of useful halosilanes include, but are not limited to, [3-(2,2,5,5-tetramethyl-1-aza-2,5-disila-1-cyclopentyl)-1-propyl](methyl)(dichloro)silane, [3-(2,2,5,5-tetraphenyl-1-aza-2,5-disila-1-cyclopentyl)-1-propyl](methyl)(dichloro)silane, [3-(2,2,5,5-tetramethyl-1-aza-2,5-disila-1-cyclopentyl)-1-propyl](trichloro)silane, [3-(2,2,5,5-tetraphenyl-1-aza-2,5-disila-1-cyclopentyl)-1-propyl](trichloro)silane, [3-(2,2,5,5-tetramethyl-1-aza-2,5-disila-1-cyclopentyl)-1-propyl](dimethyl)(chloro)silane, [3-(2,2,5,5-tetraphenyl-1-aza-2,5-disila-1-cyclopentyl)-1-propyl](dimethyl)(chloro)silane, [4-(2,2,5,5-tetramethyl-1-aza-2,5-disila-1-cyclopentyl)-1-butyl](methyl)(dichloro)silane, [4-(2,2,5,5-tetraphenyl-1-aza-2,5-disila-1-cyclopentyl)-1-butyl](methyl)(dichloro)silane, [4-(2,2,5,5-tetramethyl-1-aza-2,5-disila-1-cyclopentyl)-1-butyl](trichloro)silane, [4-(2,2,5,5-tetraphenyl-1-aza-2,5-disila-1-cyclopentyl)-1-butyl](trichloro)silane, [4-(2,2,5,5-tetramethyl-1-aza-2,5-disila-1-cyclopentyl)-1-butyl](dimethyl)(chloro)silane, and [4-(2,2,5,5-tetraphenyl-1-aza-2,5-disila-1-cyclopentyl)-1-butyl](dimethyl)(chloro)silane.

The amount of the halosilane compound that can be reacted with the reactive polymer may depend on various factors including the type and amount of catalyst or initiator used to initiate the polymerization and the desired degree of functionalization. In one or more embodiments, where the reactive polymer is prepared by employing a lanthanide-based catalyst, the amount of the halosilane compound employed can be described with reference to the lanthanide metal of the lanthanide compound. For example, the molar ratio of the halosilane compound to the lanthanide metal may be from about 1:1 to about 200:1, in other embodiments from about 5:1 to about 150:1, and in other embodiments from about 10:1 to about 100:1.

In other embodiments, such as where the reactive polymer is prepared by using an anionic initiator, the amount of the halosilane compound employed can be described with reference to the amount of metal cation associated with the initiator. For example, where an organolithium initiator is employed, the molar ratio of the halosilane compound to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the halosilane may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the halosilane. Advantageously, one or more halosilanes of the present invention form technologically useful and stable solutions in aliphatic solvents such as hexane, cyclohexane, and/or derivatives thereof. In one or more embodiments, the concentration of the halosilane in aliphatic solvent may be at least 0.05 molar, in other embodiments at least 0.5 molar, in other embodiments at least 1 molar and in other embodiments from about 0.5 to about 3 molar.

In one or more embodiments, the halosilane compound may be reacted with the reactive polymer in conjunction with other reagents or compounds that may react with the reactive polymer. For example, the halosilane compound may be employed in conjunction with a coupling agent that serves to couple two or more reactive polymer chains into a single macromolecule. Exemplary coupling agents include metal halides such as tin tetrachloride; metalloid halides such as silicon tetrachloride and boron trichloride; metal ester-carboxylate complexes such as dioctyltin bis(octylmaleate); alkoxysilanes such as tetraethyl orthosilicate and (3-glycidyloxypropyl)trimethoxysilane; and alkoxystannanes such as tetraethoxytin.

In one or more embodiments, the halosilane compound can be reacted with the reactive polymer after a desired monomer conversion is achieved but before the polymerization mixture is quenched by a quenching agent. In one or more embodiments, the reaction between the halosilane compound and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the halosilane compound and the reactive polymer can occur once the peak polymerization temperature is reached. In other embodiments, the reaction between the halosilane compound and the reactive polymer can occur after the reactive polymer has been stored. In one or more embodiments, the storage of the reactive polymer occurs at room temperature or below under an inert atmosphere. In one or more embodiments, the reaction between the halosilane compound and the reactive polymer may take place at a temperature from about 10° C. to about 150° C., and in other embodiments from about 20° C. to about 100° C. The time required for completing the reaction between the halosilane compound and the reactive polymer depends on various factors such as the type and amount of the catalyst or initiator used to prepare the reactive polymer, the type and amount of the halosilane compound, as well as the temperature at which the functionalization reaction is conducted. In one or more embodiments, the reaction between the halosilane compound and the reactive polymer can be conducted for about 10 to 60 minutes.

In one or more embodiments, after the reaction between the reactive polymer and the halosilane compound has been accomplished or completed, a quenching agent can be added to the polymerization mixture in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

In one or more embodiments, after the introduction of the halosilane compound to the reactive polymer, optionally after the addition of a quenching agent and/or antioxidant, an optionally after recovery or isolation of the functionalized polymer, a condensation accelerator can be added to the polymerization mixture. Useful condensation accelerators include tin and/or titanium carboxylates and tin and/or titanium alkoxides. One specific example is titanium 2-ethylhexyl oxide. Useful condensation catalysts and their use are disclosed in U.S. Publication No. 2005/0159554A1, which is incorporated herein by reference.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

In one or more embodiments, after the reaction between the reactive polymer and the halosilane compound has been accomplished or completed, optionally after the addition of a quenching agent and/or condensation catalyst, and optionally after recovery or isolation of the functionalized polymer, further reactions may be carried out with the functionalized polymer. For example, the functionalized polymer product can be treated with an alcohol, optionally in the presence of appropriate catalysts, which is believed to effect the formation of hydrocarbyloxy groups in lieu of hydroxy groups or halogen atoms that may be associated with the functional group of the polymer. In these or other embodiments, the functionalized polymers resulting from practice of the present invention can be exposed to or treated with water, optionally in the presence of a of a catalyst, in order to cleave or replace any hydrolyzable protecting groups that may be present or associated with the functional group of the polymer. Strong acid catalysts, such as those described herein, may be used for this purpose.

While the halosilane compound and reactive polymer are believed to react to produce novel functionalized polymers, the exact chemical structure of the functionalized polymer produced in every embodiment is not known with any great degree of certainty, particularly as the structure relates to the residue imparted to the polymer chain end by the halosilane compound. Indeed, it is speculated that the structure of the functionalized polymer may depend upon various factors such as the conditions employed to prepare the reactive polymer (e.g., the type and amount of the catalyst or initiator) and the conditions employed to react the halosilane compound with the reactive polymer (e.g., the type and amount of the halosilane compound).

In one or more embodiments, one of the products resulting from the reaction between the halosilane compound and the reactive polymer may include a functionalized polymer defined by the formula:

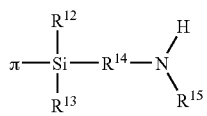

where $R^{12}$ includes a monovalent organic group, $R^{13}$ includes a monovalent organic group, a hydroxy group, or a halogen atom, $R^{14}$ includes a covalent bond or a divalent organic group, $R^{15}$ includes a hydrogen atom or a monovalent organic group, and $\pi$ is a polymer. In particular embodiments, where $\pi$ is a cis-1,4-polydiene having a cis-1,4-linkage content that is greater than about 60%, $R^{12}$, $R^{13}$, or both $R^{12}$ and $R^{13}$ may be a hydrocarbyloxy group.

In one or more embodiments, the polymer chain ($\pi$) of the functionalized polymer contains unsaturation. In these or other embodiments, the polymer chain is vulcanizable. In particular embodiments, where the reactive polymer is prepared by employing a functional anionic initiator, the head of the polymer chain ($\pi$) includes a functional group that is the residue of the functional initiator.

The functionalized polymers of this invention can have a glass transition temperature ($T_g$) that is less than 0° C., in other embodiments less than −20° C., and in other embodiments less than −30° C. In one embodiment, the polymers may exhibit a single glass transition temperature.

In one or more embodiments, the polymer backbone, which may be referred to as a polymer chain (e.g., $\pi$), prepared according to this invention may be cis-1,4-polydienes having a cis-1,4-linkage content (which may be referred to as mer content) that is greater than 60%, in other embodiments greater than about 75%, in other embodiments greater than about 90%, and in other embodiments greater than about 95%. Also, these polymers may have a 1,2-linkage content that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity ($M_w/M_n$) of these polymers may be from about 1.5 to about 5.0, and in other embodiments from about 2.0 to about 4.0.

In one or more embodiments, the polymer backbone (e.g., $\pi$) prepared according to this invention may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer backbone (e.g., $\pi$) are copolymers of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In particular embodiments, where the polydiene polymers are prepared by employing a functional anionic initiator, the head of the polymer chain (e.g., $\pi$) includes a functional group that is the residue of the functional initiator.

In one or more embodiments, the polymer chain $\pi$ is an anionically-polymerized polymer selected from the group consisting of polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of these polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

Also provided by this invention are functionalized anionic polymers including functionalized polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of the polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity of the polymers may be from about 1.0 to about 3.0, and in other embodiments from about 1.1 to about 2.0.

Advantageously, the functionalized polymers of this invention exhibit improved cold-flow resistance and provide vulcanizates that demonstrate reduced hysteresis. The functionalized polymers are particularly useful in preparing tire components. These tire components can be prepared by using the functionalized polymers alone or together with other rubbery polymers (i.e., polymers that can be vulcanized to form compositions possessing elastomeric properties). Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. For example, the vulcanizing agents may be introduced at a temperature less than 140° C., in other embodiments less than 120° C., and in other embodiments less than 110° C. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

Examples

Preparation of Halosilane

N-trimethylsilyl-2-chloro-2-methy-1-aza-2-silacyclopentane (cyclic APMCS, which may be referred to as c-APMCS) was prepared as follows. To a 300 mL nitrogen purged bottle equipped with stir bar was added 20.1 g (0.1 mol) of N,N-bis (trimethylsilyl)allyl amine, 11.5 g (0.1 mol) of dichloromethylsilane, and 0.81 mL of 2.4 wt % Karsted's Catalyst in xylene. The solution was stirred for 72 hrs, then heated at 65° C. for 2 hrs, and heated at 100° C. for a further 3 days. The product was distilled at 85-90° C. at 25 mm Hg. GC/MS confirmed structure. Proton NMR was also used to determine structure.

A second, higher boiling fraction (120° C. at 8 mm Hg) was removed from the synthesis of c-APMCS. This was confirmed to be [N,N-bis(trialkylsilyl)-(3-amino-1-propyl)]methyl)(dichloro)silane (linear APMCS, which may be referred to as 1-APMCS) by GC/MS.

Sample 1

To an 20 L reactor equipped with turbine agitator blades was added 5.79 kg hexane, 1.36 kg 34 wt % styrene in hexane, and 4.11 kg 22.2 wt % butadiene in hexane. To the reactor was charged 7.09 mL of 1.6 M butyl lithium in hexane, 0.85 mL 1.6 M 2,2'-di(tetrahydrofuryl)propane in hexane, and 0.79 mL 1.0 M potassium t-amylate and the jacket temperature was heated to 82° C. When the batch reached 82° C., the jacket was flooded with chilled water. The peak temperature of 86.8° C. was reached 4 minutes later. Twenty minutes after the peak temperature was reached, 10.21 mL of 1 M [N,N-bis(trimethylsilyl)-(3-amino-1-propyl)](methyl)(diethoxy) silane (APMDEOS) was added to the reactor. After 120 minutes, the reactor contents were discharged into isopropanol containing antioxidant and drum dried. The isolated polymer had the following properties: $M_n$=122.6 kg/mol, $M_w$=135.8 kg/mol, $T_g$=−39.9° C.

Sample 2

To an 8 L reactor equipped with turbine agitator blades was added 1.66 kg hexane, 0.68 kg 34.0 wt % styrene in hexane, and 2.10 kg 21.7 wt % butadiene in hexane. To the reactor was charged 3.54 mL of 1.6 M butyl lithium in hexane and 0.21 mL of 1.6 M 2,2'-di(tetrahydrofuryl)propane in hexane, and 0.33 mL 1.2M potassium t-amylate and the jacket temperature was heated to 82° C. When the batch reached 82° C., the jacket was flooded with chilled water. The peak temperature of 92.2° C. was reached 3 minutes later. Fourteen minutes after the peak temperature was reached, 1.06 g of c-APMCS was added to the reactor. After 20 minutes, the reactor contents were discharged into nitrogen purged bottles. Then, 3 eq titanium 2-ethylhexyloxide per butyl lithium was added to the cement. The cement was then coagulated in isopropanol containing antioxidant and drum dried. The isolated polymer had the following properties: $M_n$=137.8.4 kg/mol; $M_w$=176.5 kg/mol, $T_g$=−44.8° C.; Styrene=36.4%; NMR block styrene (3 or more repeat styrene mer units)=19.2%; 1,2 butadiene (Vinyl)=23.6%.

Sample 3

To an 8 L reactor equipped with turbine agitator blades was added 1.43 kg hexane, 0.67 kg 34 wt % styrene in hexane, and 2.34 kg 19.7 wt % butadiene in hexane. To the reactor was charged 3.54 ml of 1.6 M butyl lithium in hexane, 0.18 mL 1.6 M 2,2'-di(tetrahydrofuryl)propane in hexane, and 0.40 mL 1.0 M potassium t-amylate and the jacket temperature was heated to 82° C. When the batch reached 82° C., the jacket was flooded with chilled water. The peak temperature of 91.3° C. was reached 4 minutes later. Ten minutes after the peak temperature was reached, 5.10 mL of 1 M APMDEOS was added to the reactor. After 67 minutes, the reactor contents were discharged into nitrogen purged bottles. To each bottle was added titanium 2-ethylhexyloxide at 1 mol/mol BuLi. The cement was then coagulated in isopropanol containing antioxidant. The isolated polymer had the following properties: $M_n$=116.4 kg/mol; $M_w$=132.5 kg/mol; $T_g$=−49.6° C.; Styrene 35.2%; NMR block styrene=18.2%; Vinyl=20.4%.

Sample 4

To an 8 L reactor equipped with turbine agitator blades was added 1.43 kg hexane, 0.67 kg 34 wt % styrene in hexane, and 2.34 kg 19.7 wt % butadiene in hexane. To the reactor was charged 3.54 ml of 1.6 M butyl lithium in hexane, 0.18 mL 1.6 M 2,2'-di(tetrahydrofuryl)propane in hexane, and 0.40 mL 1.0 M potassium t-amylate and the jacket temperature was heated to 82° C. When the batch reached 82° C., the jacket was flooded with chilled water. The peak temperature of 91.3° C. was reached 4 minutes later. Ten minutes after the peak temperature was reached, 1.06 g of c-APMCS was added to the reactor. After 67 minutes, the reactor contents were discharged into nitrogen purged bottles. To each bottle was added titanium 2-ethylhexyloxide at 1 mol/mol BuLi. The cement was then coagulated in isopropanol containing antioxidant. The isolated polymer had the following properties: $M_n$=113.0 kg/mol; $M_w$=130.8 kg/mol; $T_g$=−50.7° C.; % Styrene 34.6%; NMR block styrene=18.2%; Vinyl=21.1%.

Sample 5

To an 8 L reactor equipped with turbine agitator blades was added 1.43 kg hexane, 0.67 kg 34 wt % styrene in hexane, and 2.34 kg 19.7 wt % butadiene in hexane. To the reactor was charged 3.54 ml of 1.6 M butyl lithium in hexane, 0.18 mL 1.6 M 2,2'-di(tetrahydrofuryl)propane in hexane, and 0.40 mL 1.0 M potassium t-amylate and the jacket temperature was heated to 82° C. When the batch reached 82° C., the jacket was flooded with chilled water. The peak temperature of 91.3° C. was reached 4 minutes later. Two minutes after the peak temperature was reached, 1.61 g of [N,N,-bis(trialkylsilyl)-(3-amino-1-propyl)(methyl)(dichloro)silane (1-APMCS) was added to the reactor. After 169 minutes, the reactor contents were discharged into nitrogen purged bottles. To each bottle was added titanium 2-ethylhexyloxide at 1 mol/mol BuLi. The cement was then coagulated in isopropanol containing antioxidant. The isolated polymer had the following properties: $M_n$=148.4 kg/mol; $M_w$=216.1 kg/mol; % Coupling 49.3, $T_g$=−51.4° C.; Styrene 35.2%; NMR block styrene=20.7%; Vinyl=22.6%.

Compounding

The polymers of Samples 1-5 were formulated into rubber compositions of the type that are useful in the preparation of tire treads. Specifically, the rubber compositions were prepared within a 65 g Banbury mixer operating at 60 RPM and 133° C. by employing the ingredients and a three-stage mix procedure as provided in Table 1. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature. The remill was mixed by adding the initial masterbatch and silane shielding agent to the mixer simultaneously. The initial mixer temperature was 95° C. and it was operating at 60 RPM. The final material was removed from the mixer after three minutes when the material temperature was 145° C. The sample was transferred to a mill operating at a temperature of 60° C., where it was sheeted and subsequently cooled to room temperature. The final was mixed by adding the remill and the curative materials to the mixer simultaneously. The initial mixer temperature was 65° C. and it was operating at 60 RPM. The final material was removed from the mixer after 2.5 minutes when the material temperature was between 90-95° C.

TABLE 1

| Ingredient | Parts by Weight |
|---|---|
| Initial Mix Stage | |
| Polymer Sample | 80 |
| Natural Rubber | 20 |
| Silica | 52.5 |
| Antioxidant | 0.95 |
| Stearic Acid | 2 |
| Oil | 10 |
| Wax | 2 |
| Remill Mix Stage | |
| Silane Shielding Agent | 5 |
| Silica | 2.5 |
| Final Mix Stage | |
| Sulfur | 1.5 |
| Accelerators | 3.1 |
| Zinc Oxide | 2.5 |

The finals were sheeted into Dynastat buttons and 15.24 cm×15.24 cm×0.19 cm sheets. The samples were cured at 171° C. for 15 minutes in standard molds placed in a hot press. Cured and uncured samples were tested for various properties and the results thereof are set forth in Table 2.

TABLE 2

| | Sample Number | | | | |
|---|---|---|---|---|---|
| | Sample 1 | Sample 2 | Sample 3 | Sample 4 | Sample 5 |
| Polymer Type | (Comparative) | c-APMCS "Modified" | (Comparative) | c-APMCS | 1-APMCS "Modified" |
| $ML_{1+4}$ (100° C.) | 82.8 | 105.1 | 82.5 | 77.4 | 83.1 |
| 200% Modulus @23° C. (MPa) | 9.03 | 8.47 | 7.65 | 8.50 | 8.52 |
| $T_b$ @23° C. (MPa) | 21.23 | 22.99 | 30.81 | 23.85 | 28.25 |
| $E_b$ @23° C. (%) | 302 | 320 | 376 | 326 | 350 |
| tan δ 5% E, 60° C., 10 Hz | 0.106 | 0.090 | 0.102 | 0.091 | 0.114 |
| G' (MPa), 5% E, 60° C., 10 Hz | 2.920 | 2.521 | 1.949 | 1.851 | 2.809 |
| ΔG' (50° C.) (MPa) | 1.357 | 0.798 | 0.560 | 0.405 | 1.335 |

The Mooney viscosity ($ML_{1+4}$) of the uncured compound was determined at 130° C. by using a Alpha Technologies Mooney viscometer with a large rotor, a one-minute warm-up time, and a four-minute running time. The Payne effect data (ΔG') and hysteresis data (tan δ) of the vulcanizates were obtained from a dynamic strain sweep experiment, which was conducted at 50° C. and 15 Hz with strain sweeping from 0.1% to 15%. ΔG' is the difference between G' at 0.1% strain and G' at 14.5% strain. The mechanical properties including modulus, tensile strength at break ($T_b$), and elongation at break ($E_b$) where determined according to ASTM D 412.

As can be seen in Table 2, the functionalized polymer showed a lower tan δ at 60° C., a predictor for better rolling resistance. Also, the ΔG' of the functionalized polymer is much lower, indicating that the Payne Effect has been reduced. Thus, the polymer and filler are interacting more in the halosilane functionalized polymer than the control polymer. This indicates the termination was more efficient with the chlorosilane.

Sample 6

To a 8 L reactor equipped with turbine agitator blades were added 1.605 kg of hexane and 2.861 kg of 22.2 wt % butadiene in hexane. A preformed catalyst was prepared by mixing 7.35 mL of 4.32 M methylaluminoxane in toluene, 1.54 g of 22.2 wt % 1,3-butadiene in hexane, 0.59 mL of 0.537 M neodymium versatate in cyclohexane, 6.67 mL of 1.0 M diisobutylaluminum hydride in hexane, and 1.27 mL of 1.0 M diethylaluminum chloride in hexane. The catalyst was aged for 15 minutes and charged into the reactor. The reactor jacket temperature was then set to 65° C. Sixty minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The Mooney viscosity ($ML_{1+4}$) of the resulting polymer was determined to be 27.3 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 112,400, a weight average molecular weight ($M_w$) of 206,800, and a molecular weight distribution ($M_w/M_n$) of 1.84. The infrared spectroscopic analysis of the polymer indicated a cis-1,4-linkage content of 94.7%, a trans-1,4-linkage content of 4.8%, and a 1,2-linkage content of 0.5%. The properties of the polymer are summarized in Table 3.

TABLE 3

| | Samples | | | |
|---|---|---|---|---|
| | Sample 6 | Sample 7 | Sample 8 | Sample 9 (Comparative) |
| Polymer type | unmodified | unmodified | c-APMCS-modified | APMDEOS-modified |
| Mooney viscosity | 27.3 | 45.0 | 34.9 | 23.7 |
| $M_n$ | 112,400 | 130,700 | 112,200 | 105,000 |
| $M_w$ | 206,800 | 260,500 | 227,200 | 210,400 |
| $M_w/M_n$ | 1.84 | 1.99 | 2.03 | 2.00 |
| Microstructure: | | | | |
| % cis | 94.7 | 95.0 | 94.2 | 94.2 |
| % trans | 4.8 | 4.4 | 5.2 | 5.2 |
| % vinyl | 0.5 | 0.5 | 0.6 | 0.6 |

Sample 7

To a 8 L reactor equipped with turbine agitator blades were added 1.631 kg of hexane and 2.835 kg of 22.4 wt % butadiene in hexane. A preformed catalyst was prepared by mixing 6.10 mL of 4.32 M methylaluminoxane in toluene, 1.27 g of 22.4 wt % 1,3-butadiene in hexane, 0.49 mL of 0.537 M neodymium versatate in cyclohexane, 5.53 mL of 1.0 M diisobutylaluminum hydride in hexane, and 1.05 mL of 1.0 M diethylaluminum chloride in hexane. The catalyst was aged for 15 minutes and charged into the reactor. The reactor jacket temperature was then set to 65° C. Seventy minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The properties of the resulting polymer are summarized in Table 3.

Sample 8

To a 8 L reactor equipped with turbine agitator blades were added 1.499 kg of hexane and 2.967 kg of 21.4 wt % butadiene in hexane. A preformed catalyst was prepared by mixing 7.35 mL of 4.32 M methylaluminoxane in toluene, 1.60 g of 21.4 wt % 1,3-butadiene in hexane, 0.59 mL of 0.537 M neodymium versatate in cyclohexane, 6.67 mL of 1.0 M diisobutylaluminum hydride in hexane, and 1.27 mL of 1.0 M diethylaluminum chloride in hexane. The catalyst was aged for 15 minutes and charged into the reactor. The reactor jacket temperature was then set to 65° C. Fifty five minutes after addition of the catalyst, the polymerization mixture was cooled to room temperature.

0.420 kg of the resulting unmodified polymer cement was transferred from the reactor to a nitrogen-purged bottle, followed by addition of 7.52 mL of 0.31 M 1-trimethylsilyl-2-chloro-2-methyl-1-aza-2-silacyclopentane (c-APMCS) in hexane. The bottle was tumbled for 30 minutes in a water bath maintained at 65° C. The resulting mixture was coagulated with 3 liters of isopropanol containing 0.5 g of 2,6-di-tert-butyl-4-methylphenol and then drum-dried. The properties of the resulting c-APMCS-modified polymer are summarized in Table 3.

Sample 9 cis-1,4-Polybutadiene modified with N,N-bis(trimethylsilyl)-3-aminopropylmethyldiethoxysilane (APMDEOS) was prepared by reacting 425 g of the unmodified polymer cement from Sample 8 with 2.38 mL of 1.00 M APMDEOS in hexane. The reaction conditions and polymer work-up procedure were identical to those in Sample 8. The properties of the resulting APMDEOS-modified polymer are summarized in Table 3.

Samples 10-13

The polymer samples produced in Samples 6-9 were evaluated in a carbon black filled rubber compound. The ingredients employed in making the rubber compositions are presented in Table 4, wherein the numbers are expressed as parts by weight per hundred parts by weight of rubber (phr). Mixing was accomplished by employing a conventional mixing procedure that included the preparation of a masterbatch that was remilled, and then the cure system was added in a final mix stage.

TABLE 4

| Ingredient | Parts by weight |
|---|---|
| Initial Mix Stage | |
| Polymer Sample | 80 |
| Polyisoprene | 20 |
| Carbon black | 50 |
| Oil | 10 |
| Wax | 2 |
| Antioxidant | 1 |
| Stearic acid | 2 |
| Final Mix Stage | |
| Zinc oxide | 2.5 |
| Accelerators | 1.3 |
| Sulfur | 1.5 |

The physical properties of the vulcanizates prepared from the rubber compositions are summarized in Table 5 and FIG. 1.

TABLE 5

| | Samples | | | |
|---|---|---|---|---|
| Polymer used | Sample 10 Example 6 | Sample 11 Example 7 | Sample 12 Example 8 | Sample 13 (Comparative) |
| Polymer type | unmodified | unmodified | c-APMCS-modified | APMDEOS-modified |
| Compound ML at 130° C. | 52.3 | 69.3 | 57.7 | 48.4 |
| $T_b$ at 23° C. (MPa) | 16.2 | 16.0 | 18.3 | 17.1 |
| $E_b$ at 23° C. (%) | 417 | 392 | 446 | 443 |
| ΔG' (MPa) | 1.95 | 1.83 | 1.45 | 1.86 |
| tan δ at 50° C., 3% strain | 0.135 | 0.115 | 0.107 | 0.133 |

As can be seen in Table 5 and FIG. 1, the c-APMCS-modified cis-1,4-polybutadiene gives lower tan δ at 50° C. than the unmodified polymer, indicating that the modification with c-APMCS reduces hysteresis. The c-APMCS-modified polymer also gives lower ΔG' than the unmodified polymer, indicating that the Payne Effect has been reduced due to the stronger interaction between the modified polymer and carbon black. In contrast, the APMDEOS-modified cis-1,4-polybutadiene gives no significant reduction in hysteresis and the Payne effect.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising the steps of:
    (i) preparing a reactive polymer; and
    (ii) reacting the reactive polymer with a halosilane compound defined by the formula:

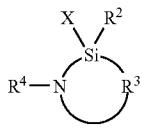

where X is a halogen atom, $R^2$ is a halogen atom, a hydrocarbyloxy group, or a monovalent organic group, $R^3$ is a divalent organic group, and $R^4$ is a monovalent organic group or a hydrolyzable group.

2. The method of claim 1, where $R^4$ is a hydrolyzable group.

3. The method of claim 1, where $R^4$ is a silyl group.

4. The method of claim 1, where the halosilane is selected from the group consisting of 1-trialkylsilyl-2-halo-2-alkyl-1-aza-2-silacycloalkane, 1-trialkylsilyl-2-halo-2-aryl-1-aza-2-silacycloalkane, 1-trialkylsilyl-2-halo-2-cycloalkyl-1-aza-2-silacycloalkane, 1-triarylsilyl-2-halo-2-alkyl-1-aza-2-silacycloalkane, 1-triarylsilyl-2-halo-2-aryl-1-aza-2-silacycloalkane, 1-triarylsilyl-2-halo-2-cycloalkyl-1-aza-2-silacycloalkane, 1-tricycloalkylsilyl-2-halo-2-alkyl-1-aza-2-silacycloalkane, 1-tricycloalkylsilyl-2-halo-2-aryl-1-aza-2-silacycloalkane, and 1-tricycloalkylsilyl-2-halo-2-cycloalkyl-1-aza-2-silacycloalkane.

5. The method of claim 1, where the halosilane is selected from the group consisting of 1-trimethylsilyl-2-chloro-2-methyl-1-aza-2-silacyclopentane, 1-triethylsilyl-2-chloro-2-methyl-1-aza-2-silacyclopentane, 1-trimethylsilyl-2-chloro-2-phenyl-1-aza-2-silacyclopentane, 1-triisopropylsilyl-2-chloro-2-phenyl-1-aza-2-silacyclopentane, 1-tri-t-butylsilyl-2-chloro-2-phenyl-1-aza-2-silacyclopentane, 1-tri-n-butylsilyl-2-chloro-2-phenyl-1-aza-2-silacyclopentane, 1-triethylsilyl-2-chloro-2-methyl-1-aza-2-silacyclohexane, 1-triethylsilyl-2-chloro-2-methyl-1-aza-2-silacycloheptane, 1-triethylsilyl-2-chloro-2-cyclopentyl-1-aza-2-silacyclopentane, 1-triethylsilyl-2-chloro-2-cyclohexyl-1-aza-2-silacyclohexane, 1-triphenylsilyl-2-chloro-2-methyl-1-aza-2-silacyclopentane, 1-triphenylsilyl-2-chloro-2-phenyl-1-aza-2-silacyclopentane, 1-triphenylsilyl-2-chloro-2-ethyl-1-aza-2-silacyclohexane, 1-cyclopentylsilyl-2-chloro-2-ethyl-1-aza-2-silacyclohexane, and 1-cyclopentylsilyl-2-chloro-2-cyclohexyl-1-aza-2-silacyclohexane.

6. The method of claim 1, where said step of preparing a reactive polymer employs a lanthanide-based catalyst system.

7. The method of claim 6, where the lanthanide-based catalyst system includes (a) a lanthanide compound, (b) an alkylating agent, and (c) a halogen-containing compound.

8. The method of claim 7, where the molar ratio of the halosilane compound to the lanthanide metal of the lanthanide-based catalyst is from about 1:1 to about 200:1.

9. The method of claim 1, where said step of preparing a reactive polymer includes employing an anionic polymerization initiator.

10. The method of claim 9, where said anionic polymerization initiator includes an organolithium compound.

11. The method of claim 1, where said step of preparing a reactive polymer takes place within a polymerization mixture including less than 20% by weight of organic solvent.

12. A compound defined by the formula

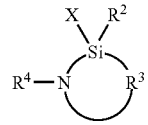

where X is a halogen atom, $R^2$ is a halogen atom, an hydrocarbyloxy group, or a monovalent organic group, $R^3$ is a divalent organic group, and $R^4$ is a hydrolyzable group.

13. The compound of claim 12, where the compound is N-trimethylsilyl-2-chloro-2-methyl-1-aza-2-silacyclopentane.

14. A solution useful for adding to a reactive polymer mixture including the compound of claim 12 dissolved in an aliphatic solvent.

15. The solution of claim 14, where the concentration of the compound dissolved within the aliphatic solvent is from about 0.05 to about 3 molar.

16. A functionalized polymer prepared by the steps of:
    (i) preparing a reactive polymer with a lanthanide-based catalyst system; and
    (ii) reacting the reactive polymer with a halosilane compound containing an amino group.

17. The functionalized polymer of claim 16, where the halosilane compound is defined by the formula

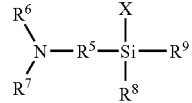

where X is a halogen atom, $R^5$ is a divalent organic group, $R^6$ and $R^7$ are each independently a monovalent organic group or a hydrolyzable group, or $R^6$ and $R^7$ join to form a divalent organic group, and $R^8$ and $R^9$ are each independently a halogen atom, a hydrocarbyloxy group, or a monovalent organic group.

18. The functionalized polymer of claim 17, where at least one of $R^6$ and $R^7$ is a hydrolyzable group, or $R^6$ and $R^7$ join to form a hydrolyzable divalent organic group.

19. The functionalized polymer of claim 17, where at least one of $R^6$ and $R^7$ is a silyl group.

20. The functionalized polymer of claim 19, where the silyl group is selected from the group consisting of trimethylsilyl group (i.e., (—Si(CH₃)₃), t-butyldimethylsilyl group, triethylsilyl group, tripropylsilyl group, and triphenylsilyl group.

21. The functionalized polymer of claim 17, where the halosilane is selected from the group consisting of [N,N-bis(trialkylsilyl)-3-amino-1-propyl](alkyl)(dihalo)silane, [N,N-bis(trialkylsilyl)-3-amino-1-propyl](trihalo)silane, [N,N-b is (trialkylsilyl)-3-amino-1-propyl](dialkyl)(halo)silane, (3-dialkylamino-1-propyl)(alkyl)(dihalo)silane, (3-dialkylamino-1-propyl)(trihalo)silane, (3-dialkylamino-1-propyl)(dialkyl)(halo)silane, (3-diarylamino-1-propyl)(alkyl)(dihalo)silane, (3-diarylamino-1-propyl)(trihalo)silane, (3-diarylamino-1-propyl)(dialkyl)(halo)silane, [N,N-b is (trialkylsilyl)-4-amino-1-butyl](alkyl)(dihalo)silane, [N,N-bis(trialkylsilyl)-4-amino-1-butyl](trihalo)silane, [N,N-bis(trialkylsilyl)-4-amino-1-butyl](dialkyl)(halo)silane, (4-dialkylamino-1-butyl)(alkyl)(dihalo)silane, (4-dialkylamino-1-butyl)(trihalo)silane, (4-dialkylamino-1-butyl)(dialkyl)(halo)silane, (4-diarylamino-1-butyl)(alkyl)(dihalo)silane, (4-diarylamino-1-butyl)(trihalo)silane, and (4-diarylamino-1-butyl)(dialkyl)(halo)silane.

22. The functionalized polymer of claim 17, where the halosilane compound is selected from the group consisting of [N,N-bis(triethylsilyl)-3-amino-1-propyl](ethyl)(dichloro)silane, [N,N-bis(trimethylsilyl)-3-amino-1-propyl](trichloro)silane, [N,N-bis(trimethylsilyl)-3-amino-1-propyl](dimethyl)(chloro)silane, (3-dimethylamino-1-propyl)(methyl)(dichloro)silane, (3-dimethylamino-1-propyl)(trichloro)silane, (3-dimethylamino-1-propyl)(dimethyl)(chloro)silane, (3-diphenylamino-1-propyl)(methyl)(dichloro)silane, (3-diphenylamino-1-propyl)(trichloro)silane, (3-diphenylamino-1-propyl)(dimethyl)(chloro)silane, [N,N-bis(trimethylsilyl)-4-amino-1-butyl](methyl)(dichloro)silane, [N,N-bis(trimethylsilyl)-4-amino-1-butyl](trichloro)silane, [N,N-bis(trimethylsilyl)-4-amino-1-butyl](dimethyl)(chloro)silane, (4-dimethylamino-1-butyl)(methyl)(dichloro)silane, (4-dimethylamino-1-butyl)(trichloro)silane, (4-dimethylamino-1-butyl)(dimethyl)(chloro)silane, (4-diphenylamino-1-butyl)(methyl)(dichloro)silane, (4-diphenylamino-1-butyl)(trichloro)silane, and (4-diphenylamino-1-butyl)(dimethyl)(chloro)silane.

23. The functionalized polymer of claim 16, where the halosilane is defined by the formula

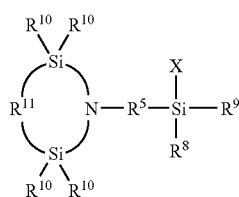

where each $R^{10}$ is individually a monovalent organic group, $R^{11}$ is a divalent organic group, $R^5$ is a divalent organic group, $R^8$ is a halogen atom, a hydrocarbyloxy group, or a monovalent organic group, $R^9$ is a halogen atom, a hydrocarbyloxy group, or a monovalent organic group, and X is a halogen atom.

24. The functionalized polymer of claim 23, where the halosilane is selected from the group consisting of [3-(2,2,5,5-tetraalkyl-1-aza-2,5-disila-1-cyclopentyl)-1-propyl](alkyl)(dihalo)silane, [3-(2,2,5,5-tetraaryl-1-aza-2,5-disila-1-cyclopentyl)-1-propyl](alkyl)(dihalo)silane, [3-(2,2,5,5-tetraalkyl-1-aza-2,5-disila-1-cyclopentyl)-1-propyl](trihalo)silane, [3-(2,2,5,5-tetraaryl-1-aza-2,5-disila-1-cyclopentyl)-1-propyl](trihalo)silane, [3-(2,2,5,5-tetraalkyl-1-aza-2,5-disila-1-cyclopentyl)-1-propyl](dialkyl)(halo)silane, [3-(2,2,5,5-tetraaryl-1-aza-2,5-disila-1-cyclopentyl)-1-propyl](dialkyl)(halo)silane, [4-(2,2,5,5-tetraalkyl-1-aza-2,5-disila-1-cyclopentyl)-1-butyl](alkyl)(dihalo)silane, [4-(2,2,5,5-tetraaryl-1-aza-2,5-disila-1-cyclopentyl)-1-butyl](alkyl)(dihalo)silane, [4-(2,2,5,5-tetraalkyl-1-aza-2,5-disila-1-cyclopentyl)-1-butyl](trihalo)silane, [4-(2,2,5,5-tetraaryl-1-aza-2,5-disila-1-cyclopentyl)-1-butyl](trihalo)silane, [4-(2,2,5,5-tetraalkyl-1-aza-2,5-disila-1-cyclopentyl)-1-butyl](dialkyl)(halo)silane, and [4-(2,2,5,5-tetraaryl-1-aza-2,5-disila-1-cyclopentyl)-1-butyl](dialkyl)(halo)silane.

25. The functionalized polymer of claim 23, where the halosilane is selected from the group consisting of [3-(2,2,5,5-tetramethyl-1-aza-2,5-disila-1-cyclopentyl)-1-propyl](methyl)(dichloro)silane, [3-(2,2,5,5-tetraphenyl-1-aza-2,5-disila-1-cyclopentyl)-1-propyl](methyl)(dichloro)silane, [3-(2,2,5,5-tetramethyl-1-aza-2,5-disila-1-cyclopentyl)-1-propyl](trichloro)silane, [3-(2,2,5,5-tetraphenyl-1-aza-2,5-disila-1-cyclopentyl)-1-propyl](trichloro)silane, [3-(2,2,5,5-tetramethyl-1-aza-2,5-disila-1-cyclopentyl)-1-propyl](dimethyl)(chloro)silane, [3-(2,2,5,5-tetraphenyl-1-aza-2,5-disila-1-cyclopentyl)-1-propyl](dimethyl)(chloro)silane, [4-(2,2,5,5-tetramethyl-1-aza-2,5-disila-1-cyclopentyl)-1-butyl](methyl)(dichloro)silane, [4-(2,2,5,5-tetraphenyl-1-aza-2,5-disila-1-cyclopentyl)-1-butyl](methyl)(dichloro)silane, [4-(2,2,5,5-tetramethyl-1-aza-2,5-disila-1-cyclopentyl)-1-butyl](trichloro)silane, [4-(2,2,5,5-tetraphenyl-1-aza-2,5-disila-1-cyclopentyl)-1-butyl](trichloro)silane, [4-(2,2,5,5-tetramethyl-1-aza-2,5-disila-1-cyclopentyl)-1-butyl](dimethyl)(chloro)silane, and [4-(2,2,5,5-tetraphenyl-1-aza-2,5-disila-1-cyclopentyl)-1-butyl](dimethyl)(chloro)silane.

* * * * *